(12) United States Patent
Kawai et al.

(10) Patent No.: US 8,913,043 B2
(45) Date of Patent: Dec. 16, 2014

(54) ELECTRONIC WRITING APPARATUS, NON-TRANSITORY RECORDING MEDIUM, AND ELECTRONIC WRITING SYSTEM

(71) Applicant: Brother Kogyo Kabushiki Kaisha, Nagoya-shi, Aichi-ken (JP)

(72) Inventors: Junya Kawai, Nagoya (JP); Atsushi Kasugai, Nagoya (JP); Takehiko Inaba, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 121 days.

(21) Appl. No.: 13/626,068

(22) Filed: Sep. 25, 2012

(65) Prior Publication Data

US 2013/0106801 A1  May 2, 2013

(30) Foreign Application Priority Data

Oct. 31, 2011  (JP) ................................. 2011-238638

(51) Int. Cl.
*G06F 3/033*  (2013.01)
*G06F 3/041*  (2006.01)
*G06F 3/0488*  (2013.01)

(52) U.S. Cl.
CPC ............. *G06F 3/033* (2013.01); *G06F 3/04883* (2013.01)
USPC ...... 345/179; 345/156; 178/18.01; 178/18.03; 178/19.01

(58) Field of Classification Search
CPC ... G06F 3/033; G06F 3/0354; G06F 3/03545; G06F 3/038; G06F 17/241–17/243; G06K 9/222; G06K 9/2054; G06K 9/2063
USPC .......... 345/179, 156; 178/18.01, 18.03, 19.01
See application file for complete search history.

(56) References Cited

U.S. PATENT DOCUMENTS

| | | | |
|---|---|---|---|
| 5,781,662 A * | 7/1998 | Mori et al. | 382/189 |
| 6,351,559 B1 | 2/2002 | Zhou et al. | |
| 6,597,808 B1 * | 7/2003 | Guo et al. | 382/173 |
| 7,983,485 B2 * | 7/2011 | Madhvanath | 382/182 |
| 2003/0107558 A1* | 6/2003 | Bryborn et al. | 345/179 |
| 2003/0122746 A1* | 7/2003 | Rignell | 345/76 |

(Continued)

FOREIGN PATENT DOCUMENTS

| JP | 2000-194850 | 4/2000 |
|---|---|---|
| JP | 2000-165651 | 6/2000 |

(Continued)

*Primary Examiner* — Quan-Zhen Wang
*Assistant Examiner* — Xuemei Zheng
(74) *Attorney, Agent, or Firm* — McCarter & English, LLP

(57) ABSTRACT

This disclosure discloses an electronic writing apparatus. The electronic writing apparatus comprises a position acquisition portion that acquires a plurality of pieces of positional information of a writing instrument moving, a first visual object detecting portion that detects a visual object for identification entered at a desired position of the media, a first data creating portion that creates image data corresponding to writing on the media and having a predetermined positional relationship with the visual object for identification, a first storage device that temporarily stores image data created by the first data creating portion, a first communication device that transmits the image data for storing the image data in the external storage device, and a first transmission control portion that controls the first communication device and performs transmission for storing the image data stored in the first storage device in the storage destination.

6 Claims, 10 Drawing Sheets

(56) References Cited

U.S. PATENT DOCUMENTS

| | | | |
|---|---|---|---|
| 2004/0085301 A1* | 5/2004 | Furukawa et al. | 345/179 |
| 2005/0034080 A1* | 2/2005 | Jaeger | 715/767 |
| 2006/0209053 A1* | 9/2006 | Cohen et al. | 345/179 |
| 2007/0217677 A1* | 9/2007 | Constantin et al. | 382/175 |
| 2008/0050019 A1* | 2/2008 | Morohoshi | 382/187 |
| 2009/0063567 A1* | 3/2009 | Matsunaga | 707/104.1 |
| 2010/0066691 A1* | 3/2010 | Li | 345/173 |

FOREIGN PATENT DOCUMENTS

| | | |
|---|---|---|
| JP | 2001-147771 | 5/2001 |
| JP | 2005-196536 | 7/2005 |
| JP | 2006-119712 | 5/2006 |
| JP | 2009-151803 | 7/2009 |

* cited by examiner

FIRST STROKE
DATA "a"

SECOND STROKE
DATA "b"

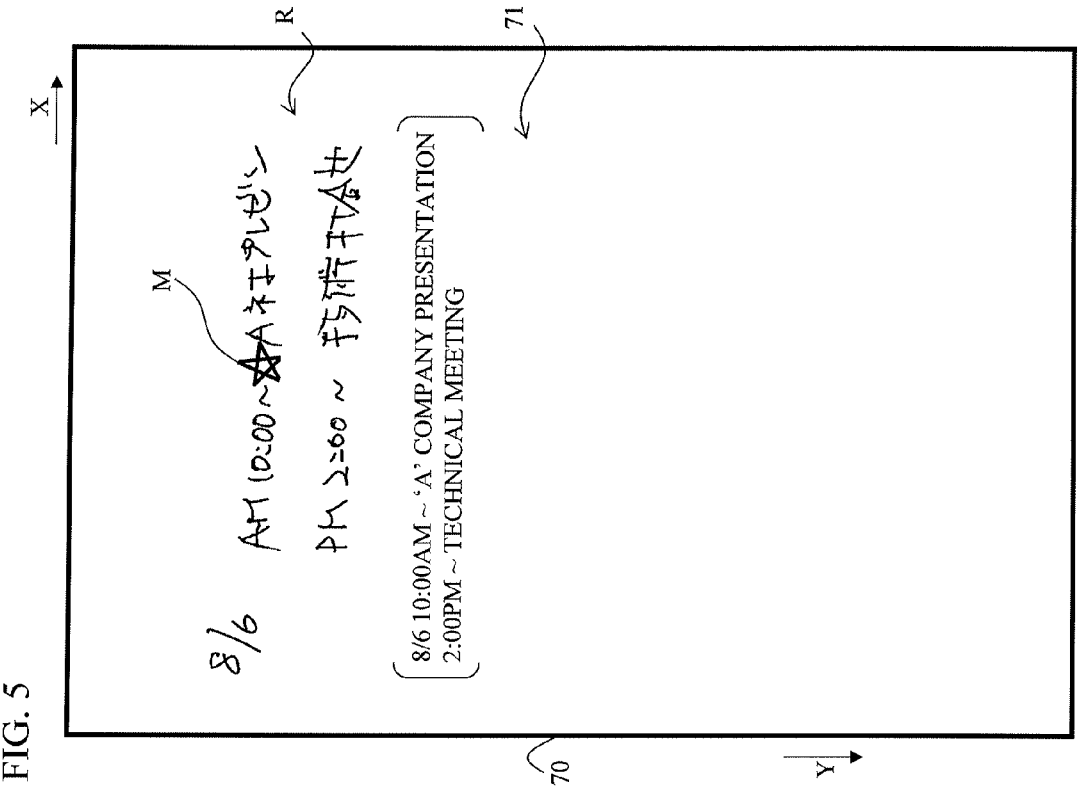

ELECTRONIC WRITING APPARATUS, NON-TRANSITORY RECORDING MEDIUM, AND ELECTRONIC WRITING SYSTEM

CROSS-REFERENCE TO RELATED APPLICATION

The present application claims priority from Japanese Patent Application No. 2011-238638, which was filed on Oct. 31, 2011, the disclosure of which is incorporated herein by reference in its entirety.

BACKGROUND

1. Field

The present disclosure relates to an electronic writing apparatus which digitizes written contents by an operator into electronic data and to a writing data processing apparatus.

2. Description of the Related Art

An electronic writing apparatus (writing input device) which digitizes contents written by an operator using a writing instrument into electronic data by has been already known. In this prior art, a media to be written (ordinary paper) is placed on holding means (a stage of hand-writing input unit). In this state, when the operator performs desired writing on the media to be written by using a writing instrument (electromagnetic pen), a detection circuit of the hand-writing input unit detects positional information of the writing instrument, and data (writing data) corresponding to writing on the media to be written is created on the basis of a plurality of pieces of positional information. After the writing operation is finished, the data corresponding to the writing on the media to be written is transmitted to an external storage device (personal computer) through a communication interface and stored therein.

When the written contents are to be digitized into electronic data as above, some operators might write various types of contents on a media to be written. In such a case, it would be extremely convenient if the digitized written contents can be automatically sorted to a category intended by the operator and stored. However, such a point was not given special consideration in the above described prior art.

SUMMARY

The present disclosure has an object to provide an electronic writing apparatus which can sort and store written contents by an operator in a category intended by the operator and can improve convenience and a writing data processing apparatus.

In order to achieve the above-described object, according to the first aspect of the present application, there is provided an electronic writing apparatus comprising: a position acquisition portion that acquires a plurality of pieces of positional information of a writing instrument moving along with a writing operation of an operator on a media to be written using the writing instrument; a first visual object detecting portion that detects a visual object for identification entered at a desired position of the media to be written for selecting a plurality of storage destinations provided in an external storage device on the basis of the positional information acquired by the position acquisition portion; a first data creating portion that creates image data corresponding to writing on the media to be written by the writing instrument and having a predetermined positional relationship with the visual object for identification on the media to be written, by using the plurality of pieces of positional information acquired by the position acquisition portion; a first storage device that temporarily stores image data created by the first data creating portion; a first communication device that transmits the image data via communication for storing the image data in the external storage device; and a first transmission control portion that controls the first communication device upon detection of the visual object for identification by the first visual object detecting portion and performs transmission for storing the image data created by the first data creating portion and stored in the first storage device in the storage destination corresponding to the visual object for identification detected by the first visual object detecting portion.

In order to achieve the above-described object, according to the second aspect of the present application, there is provided a non-transitory recording medium capable of reading by a computing device, storing writing data processing program for executing steps on a second computing device of a writing data processing apparatus that is connected with a writing position detecting apparatus and is capable of transmitting/receiving information to/from the writing position detecting apparatus and has a second communication device that transmits image data, a second storage device that stores image data, and the second computing device, the steps comprising: a second visual object detecting step for detecting a visual object for identification detected by the writing position detecting apparatus and entered at a desired position of a media to be written, for selecting a plurality of storage destinations provided in an external storage device on the basis of positional information of a writing instrument moving along with a writing operation of an operator on the media to be written provided in the writing position detecting apparatus; a second data creating step for creating image data corresponding to writing on the media to be written by the writing instrument and having a predetermined positional relationship with the visual object for identification on the media to be written by using a plurality of pieces of the positional information detected by the writing position detecting apparatus; and a second transmission control step for controlling the second communication device upon detection of the visual object for identification in the second visual object detecting step and performing transmission for storing the image data created in the second data creating step and stored in the second storage device in the storage destination corresponding to the visual object for identification detected in the second visual object detecting step.

In order to achieve the above-described object, according to the third aspect of the present application, there is provided an electronic writing system having a writing position detecting apparatus and a writing data processing apparatus, the writing position detecting apparatus comprising a position acquisition portion that acquires a plurality of pieces of positional information of a writing instrument moving along with a writing operation of an operator on a media to be written using the writing instrument; the writing data processing apparatus comprising: a second visual object detecting portion that detects a visual object for identification entered at a desired position of the media to be written for selecting a plurality of storage destinations provided in an external storage device on the basis of the positional information acquired by the position acquisition portion of the writing position detecting apparatus; a second data creating portion that creates image data corresponding to writing on the media to be written by the writing instrument and having a predetermined positional relationship with the visual object for identification on the media to be written, by using the plurality of pieces of positional information acquired by the position acquisition portion of the writing position detecting apparatus; a second storage device that temporarily stores image data created by the second data creating portion; a second communication device that transmits the image data via communication for storing the image data in the external storage device; and a second transmission control portion that controls the second communication device upon detection of the visual object for identification by the second visual object detecting portion and performs transmission for storing the image data created by the second data creating portion and stored in the second storage device in the storage destination corresponding to the visual object for identification detected by the second visual object detecting portion.

BRIEF DESCRIPTION OF THE DRAWING

FIG. 4 is an explanatory table for explaining an example of association between a pen position number and coordinate information in the stroke data.

FIG. 5 is an explanatory diagram illustrating an example when a visual object for identification is entered on a paper media.

DETAILED DESCRIPTION OF THE PREFERRED EMBODIMENTS

Figure 1:
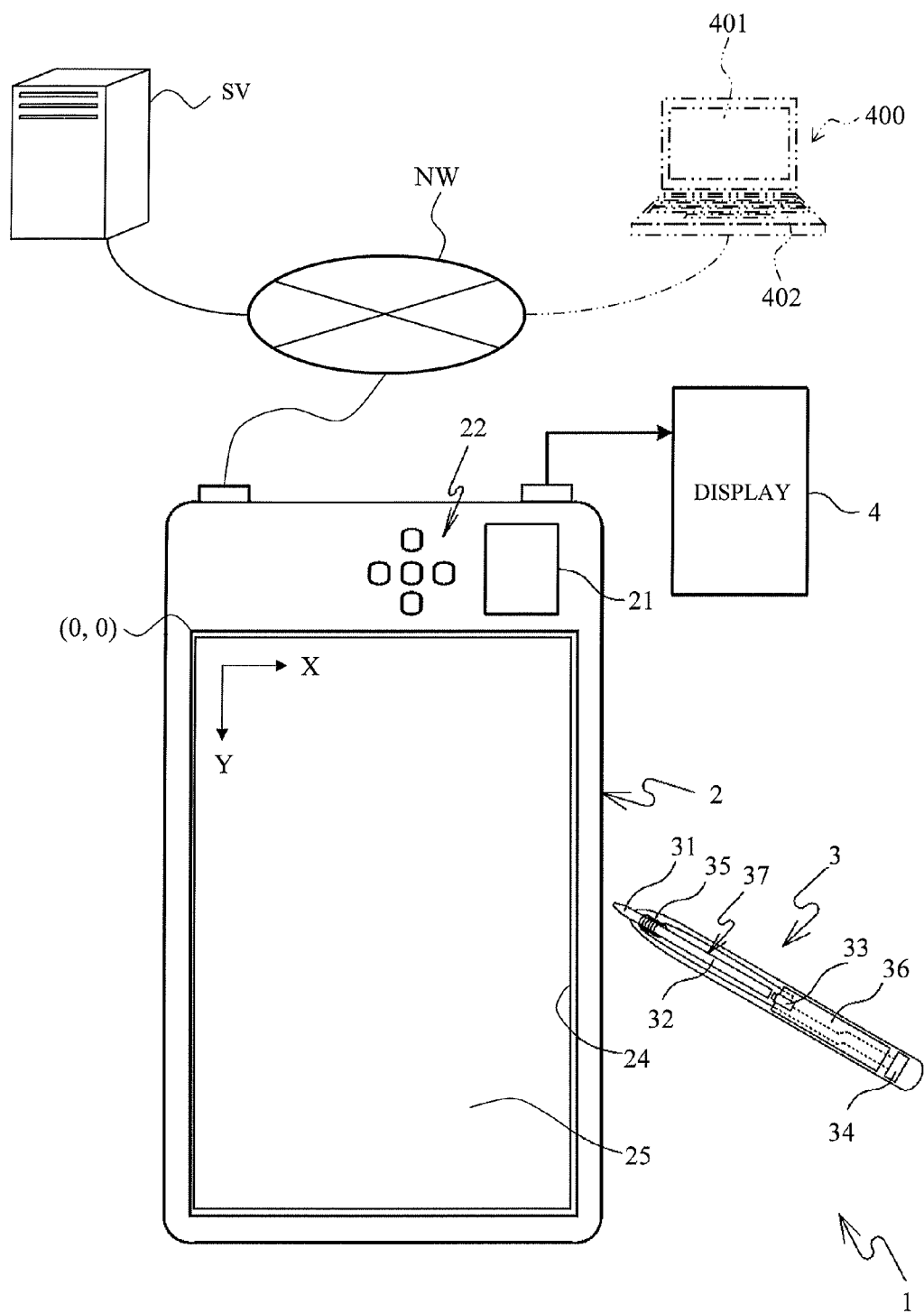
FIG. 1 is a system configuration diagram illustrating a whole configuration of a hand-writing input system provided with an electronic writing apparatus of an embodiment of the present disclosure.

An embodiment of the present disclosure will be described below by referring to the attached drawings.
<System Outline>
FIG. 1 illustrates a hand-writing input system 1 provided with an electronic writing apparatus 2 of this embodiment. Note that, in the following explanation, an upper side, a lower side, a right side, a left side, a front side, and a rear side in a drawing in FIG. 1 are defined and explained as the upper side, the lower side, the right side, the left side, the front side, and the rear side of the electronic writing apparatus 2, respectively.

As illustrated in FIG. 1, the hand-writing input system 1 includes the electronic writing apparatus 2, a so-called electromagnetic induction electronic pen 3 (writing instrument), and a display 4. Besides, an operation processing terminal 400 will be described later.
<Electronic Writing Apparatus>
The electronic writing apparatus 2 has a vertically long and thin rectangular shape in a planar view. On an upper right part of the electronic writing apparatus 2, a small-sized display 21 capable of displaying various types of information is provided. On the left side of the display 21, an input part 22 by which a user operates the electronic writing apparatus 2 is provided. Below the display 21 and the input part 22, a recess-shaped placement part 24 is provided so as to occupy the most on the front side of the electronic writing apparatus 2. On the placement part 24, a paper media 70 (See FIG. 5 which will be described later) is placed, and a coordinate detection part 25 is provided so as to occupy substantially the same range as the placement part 24. The coordinate detection part 25 detects coordinate information (the upper left part of the placement part 24 is assumed to be (0, 0), for example. The details will be described later) illustrating the position of the electronic pen 3. The placement part 24 holds the paper media 70 in an attitude that the upper left corner portion of the paper media 70 matches the above described origin in this example. Note that, the electronic writing apparatus 2 is connected to a server SV as an external storage device through a network NW via wireless (or wired) communication, for example, in this embodiment.
<Electronic Pen>
In the following description, in the electronic pen 3, a direction in which a pen tip 31 is provided is referred to as a distal end direction. Moreover, a direction opposite to the distal end direction is referred to as a rear end direction. The electronic pen 3 includes a core 37, a detection switch 33, a button type battery 34, a coil 35, and a substrate 36 in this example. The core 37 is made of metal and is composed of the pen tip 31 and an ink containing part 32. Moreover, the core 37 is provided inside the tip end portion of the electronic pen 3, and the pen tip 31 protrudes to the outside. Ink is contained in the ink containing part 32, and the ink is supplied to the pen tip 31. As a result, a user (operator) can write desired characters, figures and the like on the paper media 70 by using the electronic pen 3.

The above described substrate 36 is provided in the rear end direction of the core 37. The detection switch 33 is mounted on the distal end portion of the substrate 36, and the above described battery 34 is provided in the rear end direction of the substrate 36. The battery 34 is connected to the substrate 36, and an electrode on a negative side of the battery 34 is electrically connected to the above described coil 35 via wiring on the substrate 36. Moreover, an electrode on a positive side of the battery 34 is electrically connected to the detection switch 33 via wiring on the substrate 36. The above described detection switch 33 is electrically connected to the coil 35 via wiring on the substrate 36. The coil 35 is wound around the core 37 on the distal end portion inside the electronic pen 3.
<Detection of Coordinate Information of Electronic Pen>
Here, the core 37 is biased in the distal end direction all the time by an elastic member, not shown. The core 37 is slightly retreated to the inside of the electronic pen 3 against the biasing force of the above described elastic member, by the pressing force when the user writes characters and the like on the paper media 70. By means of this retreating, the rear end portion of the core 37 presses down the detection switch 33 and turns on the detection switch 33. As a result, the battery 34 and the coil 35 are electrically connected, a current flows from the battery 34 to the coil 35, and the current flowing through the coil 35 generates a magnetic field.

The coordinate detection part 25 of the electronic writing apparatus 2 detects the magnetic field generated from the coil 35 as above on the basis of electromagnetic induction. Since this detection can be sufficiently made by a known method, detailed explanation will be omitted. On the basis of a detection result of this coordinate detection part 25, a CPU 201 acquires a plurality of pieces of positional information (that is, the above described coordinate information) corresponding to movement of the electronic pen 3 when the user performs a writing operation on the paper media 70 by using the electronic pen 3. It is to be noted that as described above, in this embodiment, a coordinate system having a coordinate (X, Y) at an upper left part of the coordinate detection part 25 as an origin (0, 0), the right direction as the X-axis and the lower direction as the Y-axis is used. That is, a value of the X-coordinate expresses a position in the right and left direction in the coordinate detection part 25 (placement part 24), and a value of the Y-coordinate expresses a position in the vertical direction.

<Display>

Note that, the display 4 is connected to the electronic writing apparatus 2, and image data corresponding to an appearance of the paper media 70 placed by the user on the placement part 24 of the electronic writing apparatus 2 and a collection of stroke data, which will be described later, corresponding to the written contents by the user on the paper media 70 can be displayed thereon.

<Electric Configuration of Electronic Writing Apparatus>

Figure 2:
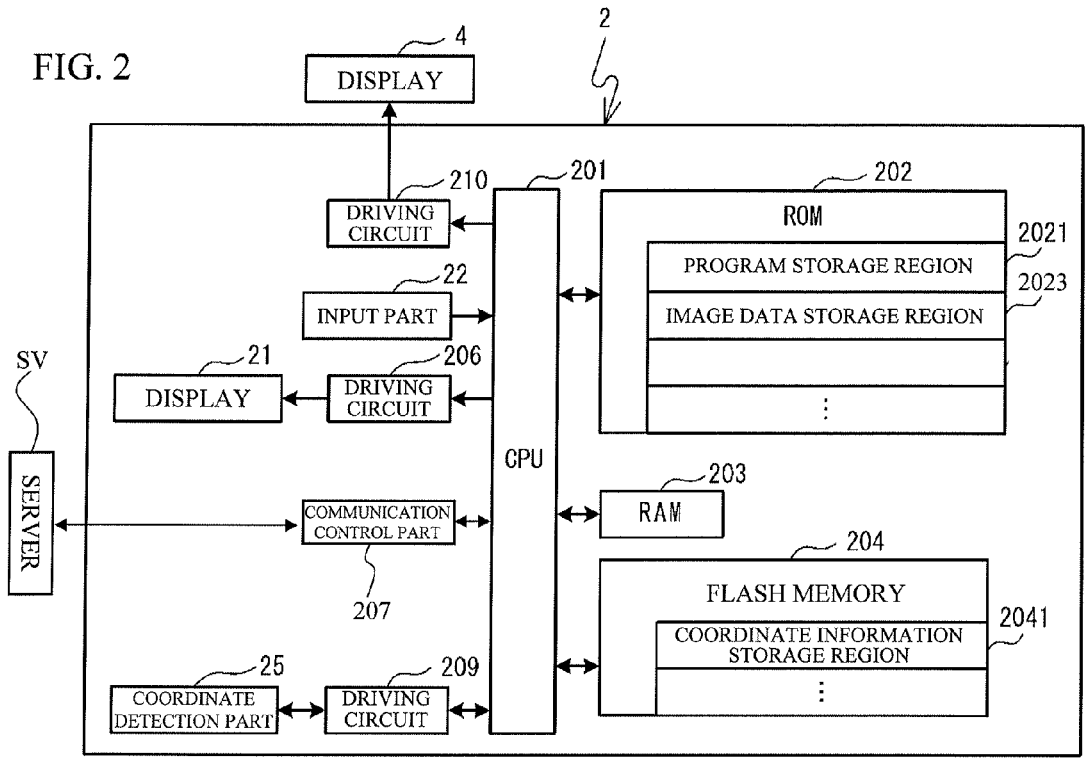
FIG. 2 is a functional block diagram illustrating an electric configuration of the electronic writing apparatus.

By referring to FIG. 2, an electric configuration of the electronic writing apparatus 2 will be described. As illustrated in FIG. 2, the electronic writing apparatus 2 includes the CPU 201 for executing control of the electronic writing apparatus 2, a ROM 202, a RAM 203 (first storage device) in which various types of data are temporarily stored, a flash memory 204, the input part 22, driving circuits 206, 209 and 210, and a communication control part 207 (first communication device) executing control of information transmission/reception with the server SV via the above described network NW.

The ROM 202, the RAM 203, and the flash memory 204 are electrically connected to the CPU 201. The ROM 202 includes a program storage region 2021 and an image data storage region 2023. In the program storage region 2021, various programs (programs for executing a data processing method of control contents illustrated in FIGS. 8 and 10 and the like which will be described later) executed by the CPU 201 for controlling the electronic writing apparatus 2 are stored. In the image data storage region 2023, image data corresponding to format information of the paper media 70 which will be described later is stored.

The flash memory 204 includes a coordinate information storage region 2041. The coordinate information storage region 2041 stores a coordinate information data table.

The input part 22 and the driving circuits 206, 209 and 210 are electrically connected to the CPU 201. The driving circuits 206 and 209 are electronic circuits for driving the display 21 and the coordinate detection part 25, respectively. The driving circuit 210 is an electronic circuit for displaying an image on the display 4.

<Creation of Stroke Data>

Figure 3:
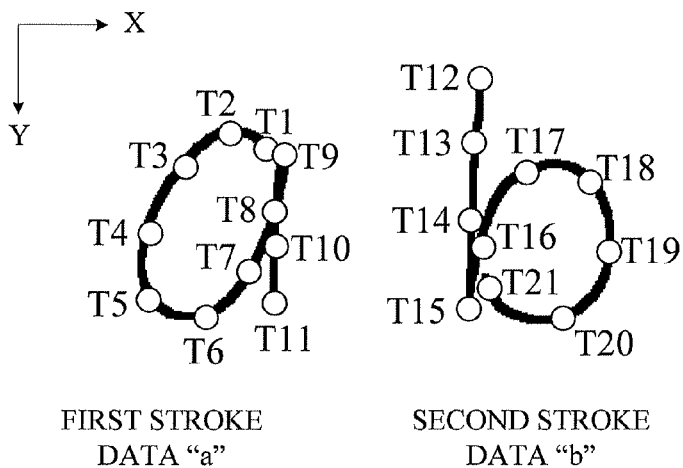
FIG. 3 is an explanatory diagram for explaining an example of stroke data.

Subsequently, stroke data will be explained by using FIGS. 3 and 4. The stroke data is a pen position data string composed of a plurality of pieces of coordinate information acquired by the CPU 201 on the basis of the detection result of the coordinate detection part 25. FIGS. 3 and 4 illustrate examples of two stroke data "a" and "b".

In FIGS. 3 and 4, first stroke data "a" is data expressing a trajectory of a traversable portion from start of writing to end of writing of a character "a" by the electronic pen 3 and includes 11 pieces of coordinate information (X1, Y1), (X2, Y2), . . . , (X11, Y11) along a time series corresponding to each of pen position numbers T1, T2, . . . , T11, respectively (See FIG. 4). Moreover, second stroke data "b" is data expressing a trajectory of a traversable portion from start of writing to end of writing of a character "b" by the electronic pen 3 and includes 10 pieces of coordinate information (X12, Y12), (X13, Y13), . . . , (X21, Y21) along a time series corresponding to each of pen position numbers T12, T13, . . . , T21, respectively (See FIG. 4). As such, the CPU 201 creates the stroke data corresponding to the contents written by the user on the paper media 70 using the electronic pen 3 by using a plurality of pieces of coordinate information corresponding to the detection result of the coordinate detection part 25. It is to be noted that a collection of a plurality of pieces of stroke data created respectively as above corresponds to image data described in each claim or particularly to character string image data.

Characteristics of this Embodiment

In the above basic configuration, the characteristics of this embodiment is that, when a user enters a predetermined mark M (visual object for identification) at a desired position, the above described stroke data corresponding to actual writing on the paper media 70 by the electronic pen 3 is automatically sorted to and stored in a folder intended by the user in a plurality of folders of the server SV. The details will be described in order below.

FIG. 5 illustrates an example in which the mark M is entered by the user on the paper media 70 (media to be written) used in this embodiment. As illustrated in the figure, in this example, a free writing area 71 in which the user can freely write desired characters, figures and the like (hereinafter simply referred to as "written characters" as appropriate. The characters may be numbers, signs, symbols and the like) R is provided on the paper media 70. In this example, "8/6" representing the month and date of August 6, for example, is written on the upper left in the free writing area 71 as the written characters R, and a group of laterally written character strings of "10:00 AM~A company presentation (AM10:00~社:プレゼン)" representing schedule contents from 10 am and "2:00 PM~technical meeting (PM2:00~技術 打ち介わせ)" representing schedule contents from 2 pm are written in two rows of upper and lower rows.

Figure 6:
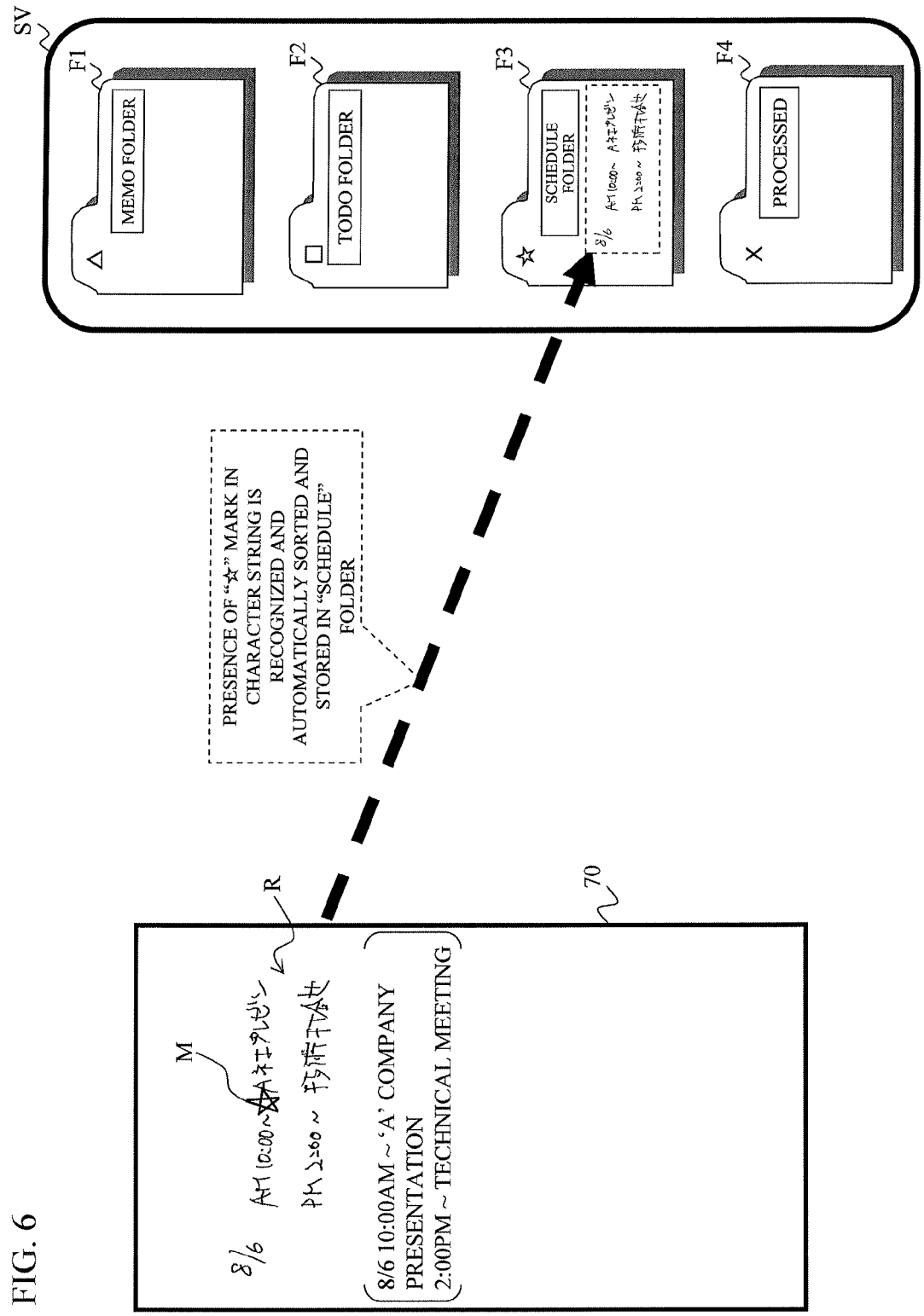
FIG. 6 is an explanatory diagram illustrating an example in which the stroke data is sorted to and stored in one folder in a server.

Here, as described above, in this embodiment, the user enters the predetermined mark M at a desired position so that the contents written by himself/herself are automatically sorted to a folder intended by the user in the server SV. At this time, in this embodiment, as illustrated in FIG. 6, four folders in total, that is, a "memo" folder F1, a "TODO" folder F2, a "schedule" folder F3, and a "processed" folder F4 are provided as folders that can be used by the user as storage destinations of the stroke data in the server SV. In addition, a triangle "△" mark M is associated with the "memo" folder F1, a square "☐" mark M is associated with the "TODO" folder, an asterisk "☆" (star) mark M is associated with the "schedule" folder, and an X (cross)-shaped "X" mark M is associated with the "processed" folder. Furthermore, when the user enters the predetermined mark M associated with a desired folder in the above described four folders F1 to F4 at a desired position having a predetermined positional relationship (which will be described later) with the written characters R, the written contents on the paper media 70 including the written characters R are stored in the above described desired folder.

<Marking in the Middle of Character String>

In the example in FIG. 6, as an example of the above described predetermined positional relationship, the "☆" mark M is written in the middle of the character string of the written characters R of "10:00 AM~A company presentation (AM10:00~社プレゼン)", that is, between the character "~" and the character "A". As a result, this "☆" mark M is recognized by the CPU 201, and the stroke data of the character string group of the above described "10:00 AM~A company presentation (AM10:00~A 社プレゼン)" and "2:00 PM~technical meeting (PM2:00~技術 打ち合わせ)" is sorted to the "schedule" folder F3 corresponding to the "☆" mark MM (See a bold broken arrow in FIG. 6) in the above described folders F1 to F4 and automatically stored in the "schedule" folder F3.

<Use of Surrounding Line or Connection Line>

Figure 7:
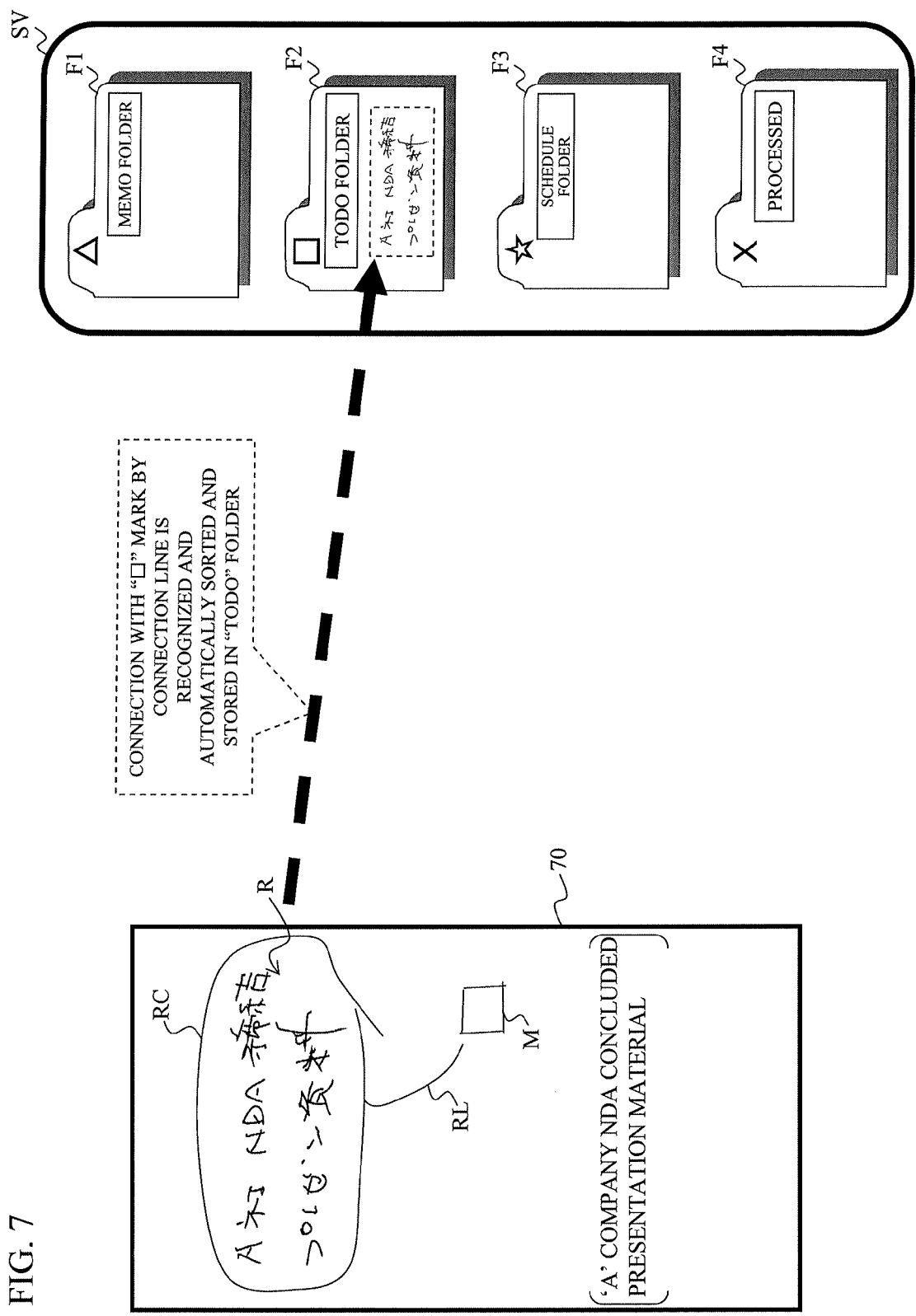
FIG. 7 is an explanatory diagram illustrating another example in which the stroke data is sorted to and stored in one folder in a server.

Another example of the predetermined positional relationship between the above described written characters R and the above described marks M will be described by using FIG. 7. In this example, the user writes the written characters R on the paper media 70 and then, surrounds the writing with a surrounding line RC and further associates it with the above described mark M by using a connection line RL extending on or the vicinity of this surrounding line RC. That is, as illustrated in FIG. 7, the written characters R of "A company NDA concluded (A 社 NDA 締結)" and "presentation material (プレゼン 資料)" are written by the user in vertical two rows on the paper media 70. Then, the surrounding line RC is entered so as to surround the written characters R, the square mark "□" mark M associated with the above described "TODO" folder F2 is entered at a position slightly distant from this surrounding line RC, and this mark M (or it may be a portion close to that) and the surrounding line RC (or it may be a portion close to that) are connected by the connection line RL. As a result, the CPU 201 recognizes that the stroke data of the written characters R within the surrounding line RC is associated with the mark M through the connection line RL. Note that, the function of detecting the surrounding line RC in this recognition function of the CPU 201 corresponds to a surrounding line detecting portion described in each claim. By using this recognition as a trigger, the stroke data of the character string group of the above described "A company NDA concluded (A 社 NDA 締結)" and "presentation material (プレゼン 資料)" is sorted to the "TODO" folder F2 corresponding to the above described "□ mark M in the above described folders F1 to F4 (See a bold broken arrow in FIG. 7) and automatically stored in the "TODO" folder F2.

<Control Flow>

A control procedure executed by the CPU 201 of the electronic writing apparatus 2 in order to realize the above described contents will be described by referring to FIG. 8. It is to be noted that, in the following, explanation will be given on the example in which the mark M is entered in the desired character string of the written characters R along the example in the above described FIG. 6, and the same applies to the case where the surrounding line RC and the mark M are connected by the connection line RL as in the example in the above described FIG. 7.

Figure 8:
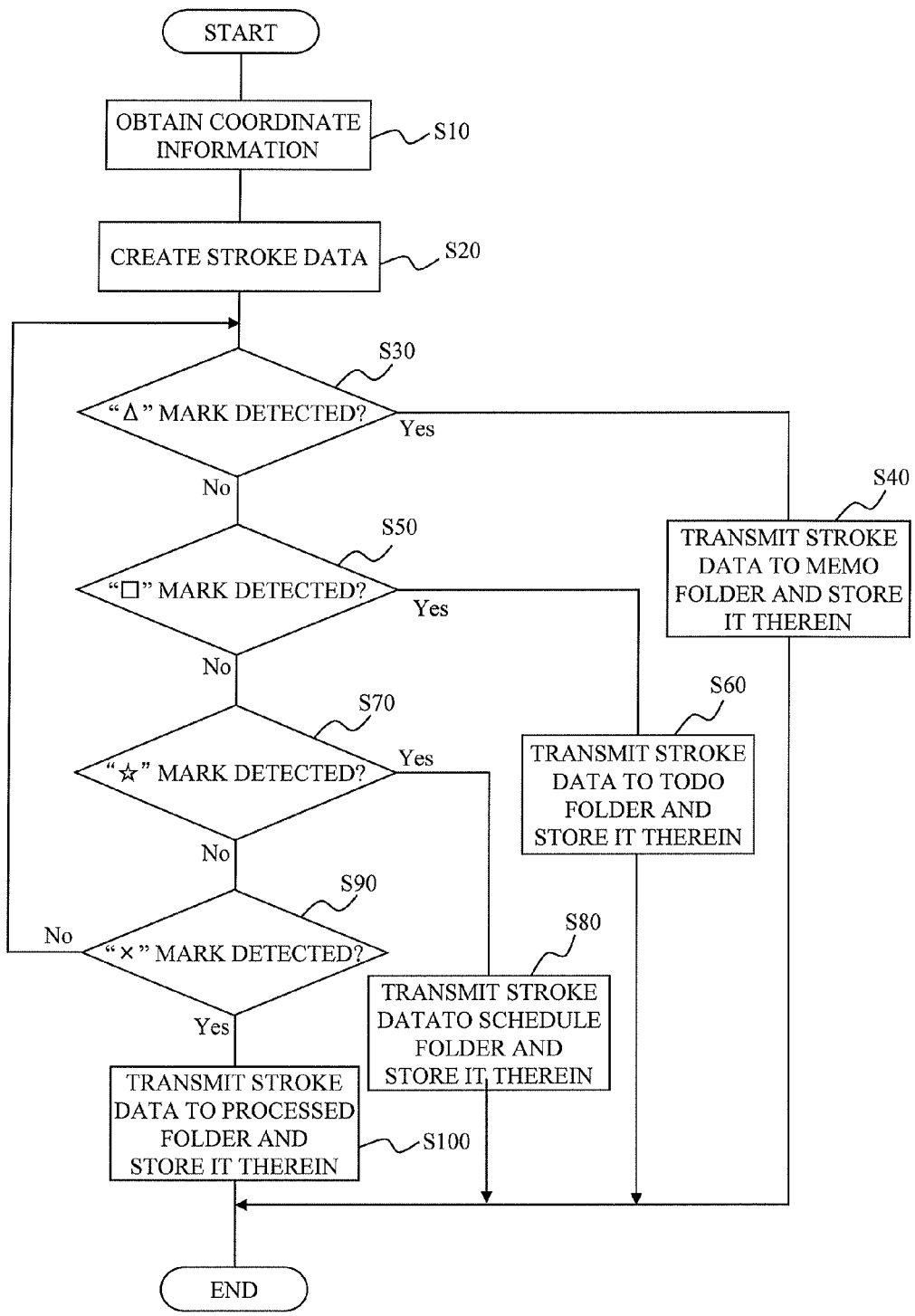
FIG. 8 is a flowchart illustrating a control procedure executed by a CPU of the electronic writing apparatus.

In FIG. 8, this flow is started upon a predetermined trigger after the electronic writing apparatus 2 is turned on, that is, upon detection of a writing operation by the electronic pen 3 through known means, for example.

First, at Step S10, the CPU 201 acquires a plurality of pieces of coordinate information of the electronic pen 3 on the basis of the detection result of the coordinate detection part 25 when the user performs writing as described above. This procedure functions as a position acquisition portion described in each claim.

After that, the procedure proceeds to Step S20, and the CPU 201 creates stroke data corresponding to contents of the written characters R by the user as described above on the basis of the coordinate information acquired at Step S10. This procedure functions as a first data creating portion described in each claim. Note that, the created stroke data is temporarily stored in the above described RAM 203.

Then, at Step S30, the CPU 201 determines whether the "Δ" mark M is detected in the stroke data of the written characters R on the basis of the creation result of the stroke data at the above described Step S20. If the "Δ" mark M has been detected, the determination at Step S30 is satisfied (S30: Yes), and the procedure proceeds to Step S40.

At Step S40, the CPU 201 recognizes the stroke data of a group of character strings of the written characters R including the "Δ" mark M as (a collection of) stroke data related to each other. In the example in FIG. 6, the character string group of "10:00 AM~A company presentation (AM10:00~A 社プレゼン)" and "2:00 PM~technical meeting (PM2:00~技術 打ち合わせ)" is recognized as (a collection of) stroke data to be sorted by the "Δ" mark. It is only necessary that the recognition is made by a known appropriate method such as proximity of coordinates of stroke data, a blank created between the stroke data and stroke data of the subsequent group of character strings, detection of a different row, a different column and the like. Then, the CPU 201 automatically transmits the stroke data of the group of character strings including the recognized "Δ" mark M from the above described communication control part 207 in the server SV via the network NW, stores it in the "memo" folder F1 corresponding to the triangle "Δ" mark M in the server SV and finishes the flow.

On the other hand, if the "Δ" mark M is not detected at Step S30, the determination at Step S30 is not satisfied (S30: No), and the procedure proceeds to Step S50. At Step S50, the CPU 201 determines whether the "□" mark M is detected in the stroke data of the written characters R on the basis of the creation result of the stroke data at the above described Step S20. If the "□" mark M is detected, the determination at Step S50 is satisfied (S50: Yes), and the procedure proceeds to Step S60.

At Step S60, the CPU 201 recognizes the stroke data of the group of character strings of the written characters R including the "□" mark M as (a collection of) stroke data related to each other as above and then, automatically transmits it to the server SV and stores it in the "TODO" folder F2 corresponding to the "□" mark M in the server SV. Then, this flow is finished.

In contrast, if "□" mark M is not detected at the above described Step S50, the determination at Step S50 is not satisfied (S50: No), and the procedure proceeds to Step S70. At Step S70, the CPU 201 determines whether the "☆" mark M is detected in the stroke data of the written characters R on the basis of the creation result of the stroke data at the above described Step S20. If the "☆" mark M is detected, the determination at Step S70 is satisfied (S70: Yes), and the procedure proceeds to Step S80.

At Step S80, the CPU 201 recognizes the stroke data of the group of character strings of the written characters R including the "☆" mark M as (a collection of) stroke data related to each other as above and then, automatically transmits it to the server SV and stores it in the "schedule" folder F3 corresponding to the "☆" mark M in the server SV. Then, this flow is finished.

On the other hand, if "☆" mark M is not detected at the above described Step S70, the determination at Step S70 is not satisfied (S70: No), and the procedure proceeds to Step S90. At Step S90, the CPU 201 determines whether the "X" mark M is detected in the stroke data of the written characters R on the basis of the creation result of the stroke data at the above described Step S20. If the "X" mark M is detected, the determination at Step S90 is satisfied (S90: Yes), and the procedure proceeds to Step S100.

At Step S100, the CPU 201 recognizes the stroke data of the group of character strings of the written characters R including the "X" mark M as (a collection of) stroke data related to each other as above and then, automatically transmits it to the server SV and stores it in the "processed" folder F4 corresponding to the "x" mark M in the server SV. Then, this flow is finished.

In contrast, if "x" mark M is not detected at the above described Step S90, the determination at Step S90 is not satisfied (S90: No), the procedure returns to Step S30, and the similar procedure is executed.

It is to be noted that the above described Step S30, Step S50, Step S70, and Step S90 function as a first visual object detecting portion described in each claim, and the above described Step S40, Step S60, Step S80, and Step S100 function as a first transmission control portion described in each claim.

Note that, as still another example of the predetermined positional relationship between the above described written characters R and the above described mark M, instead of connecting the mark M and the surrounding line RC by the connection line RL as in the above described FIG. 7, the mark M may be simply entered at a position close to the surrounding line RC (immediately outside of the surrounding line RC or immediately inside thereof) so that the CPU 201 recognizes the written characters R and the mark M.

It is to be noted that the present disclosure is not limited to the above described embodiment but is capable of various variations within a range not departing from the gist and technical idea thereof. Such variations will be sequentially explained below. Note that, the portions similar to those in the above described embodiment are given the same reference numerals, and explanation will be omitted or simplified as appropriate.

(1) Handling Additional Writing by User

That is, once the user made writing on the paper media 70 and the corresponding stroke data has been stored in any one of the folders F1 to F4 corresponding to the above described mark M, if the user further makes some writing on the above described writing remaining on the paper medium 70, data processing corresponding to the addition may be executed.

Figure 9:
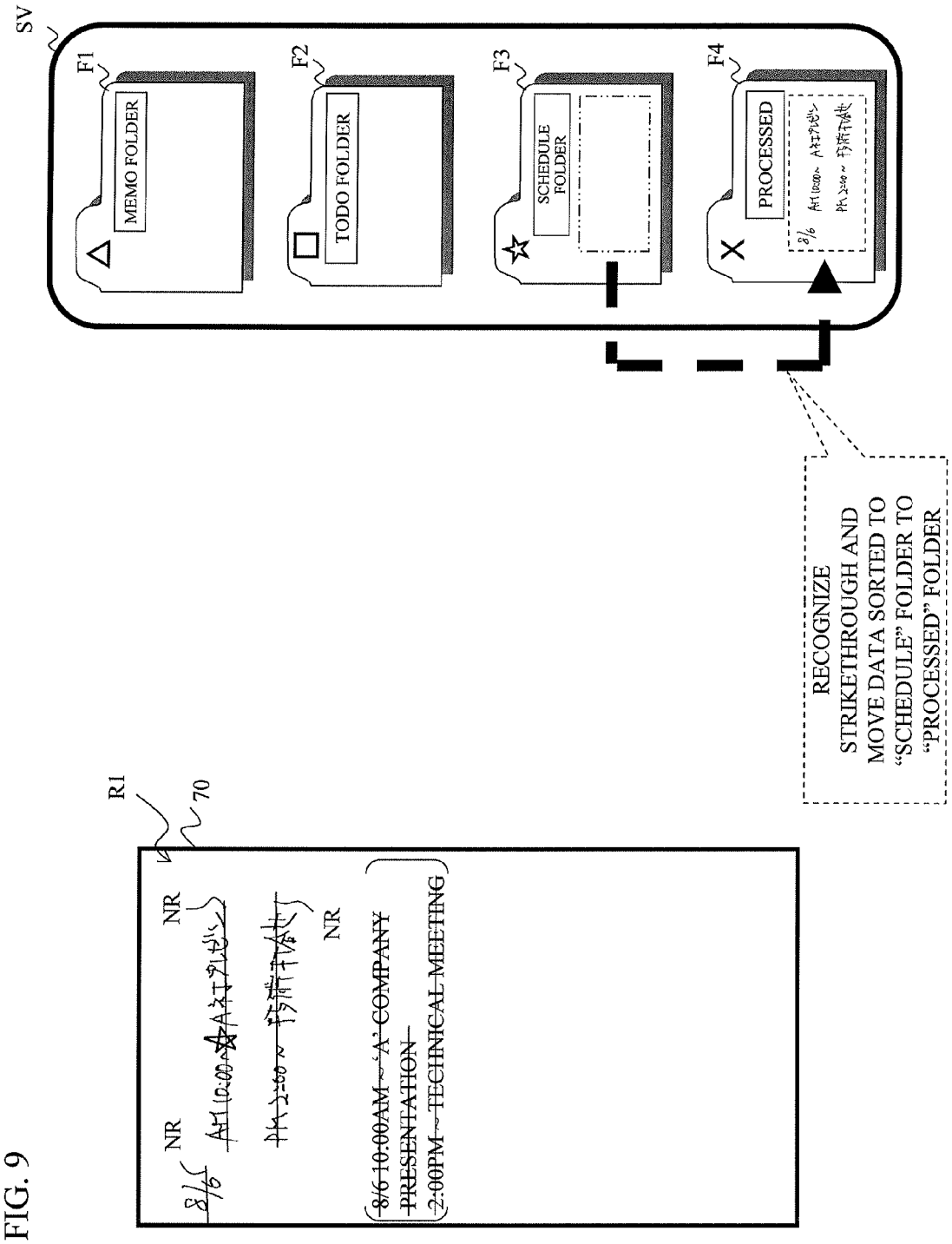
FIG. 9 is an explanatory diagram illustrating an example of written contents on a paper media in a variation corresponding to addition by a user.

FIG. 9 is an explanatory diagram illustrating an example of a state of the paper media 70 in such a variation. In this example, after the user made the writing of "10:00 AM~A company presentation (AM10:00~A 社プレゼン)" and "2:00 PM~technical meeting (PM2:00~技術 打ち合わせ)" illustrated in FIG. 6 explained in the above described embodiment and the corresponding stroke data has been stored in the "schedule" folder F3, the user adds a strikethrough NR as a visual object for identification to all these texts. In this variation, the above described strikethrough NR is associated with the "processed" folder F4. As a result, if the addition as above is made, the stroke data of "10:00 AM~A company presentation (AM10:00~A~社プレゼン)" and "2:00 PM~technical meeting (PM2:00~技術 打ち合わせ)" already present in the "schedule" folder F3 as above is moved to the "processed" folder F4 by means of control of the CPU 201. It is to be noted that another appropriate mark, symbol, number or the like may be used instead of the strikethrough NR.

Figure 10:
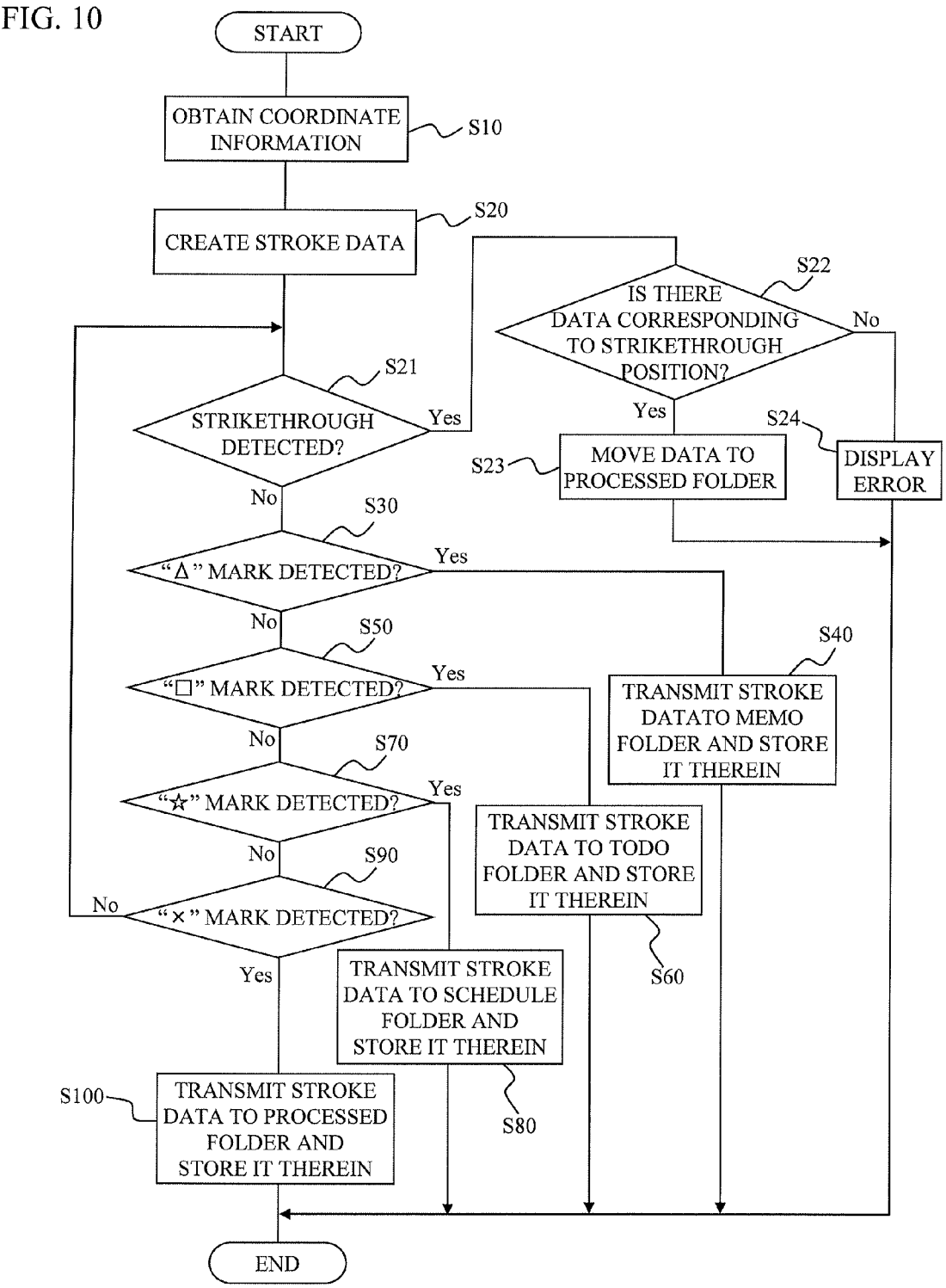
FIG. 10 is a flowchart illustrating a control procedure executed by the CPU of the electronic writing apparatus.

FIG. 10 is a flowchart illustrating a control procedure executed by the CPU in this variation in order to realize the above described contents. The procedures similar to those in the above described FIG. 8 are given the same reference numerals, and explanation will be omitted or simplified as appropriate.

In the flow illustrated in FIG. 10, Step S21 is newly provided between Step S20 and Step S30 in FIG. 8, and Step S22, Step S34, and Step S24 are further provided, branching from this Step S21.

That is, when the CPU 201 has created the stroke data corresponding to the coordinate information acquired at Step S10 as described above at Step S20, the procedure proceeds to the newly provided Step S21.

At Step S21, the CPU 201 determines if the above described strikethrough NR as the mark M on the paper media 70 is detected or not on the basis of the creation result of the stroke data at the above described Step S20. Specifically, it is determined whether one or two laterally horizontal straight lines or the like are detected or not (at this time, it is not known yet whether the straight lines are a strikethrough to cancel the past written contents in a true sense. See Step S22 which will be described later). If the strikethrough NR is not detected, the determination at Step S21 is not satisfied (S21: No), the procedure proceeds to Step S30, and the processing is executed by the procedure similar to that at Step S30 and after in FIG. 8. If the strikethrough NR is detected, the determination at Step S21 is satisfied (S21: Yes), the procedure proceeds to the newly provided Step S22.

At Step S22, the CPU 201 searches all the folders F1 to F4 and determines whether there is stroke data corresponding to the coordinate position and corresponding to the strikethrough detected at the above described Step S21 or not. If there is the stroke data corresponding to the strikethrough in any one of the folders, the determination at Step S22 is satisfied (S22: Yes), and the procedure proceeds to Step S23.

At Step S23, since the strikethrough detected at the above described Step S21 can be considered to be an entry of a true strikethrough (that is, overwriting of the strikethrough) on the actual writing corresponding to the stroke data having been stored in any of the folders in the past, the CPU 201 moves the stroke data to the "processed" folder F4. Then, this flow is finished.

On the other hand, at Step S22, if there is no stroke data corresponding to the strikethrough, the determination at Step S22 is not satisfied (S22: No), and the procedure proceeds to Step S24. At Step S24, the CPU 201 considers that the strikethrough detected at the above described Step S21 is writing of new drawing having a shape similar to a strikethrough and outputs a display signal for making a predetermined error display explicitly indicating the fact to the display 21. After that, this flow is finished.

(2) Sorting to a Plurality of Folders Separately

Figure 11A:
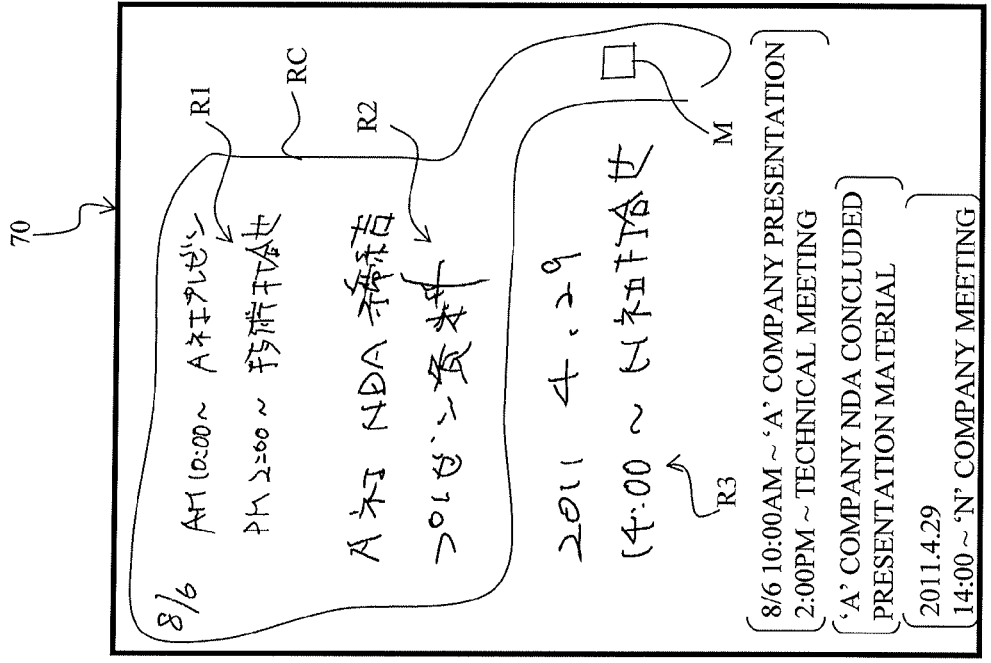
FIGS. 11A and 11B are explanatory diagrams illustrating examples of written contents on the paper media in a variation of sorting them to a plurality of folders separately and a variation in which a part of written characters are surrounded by a surrounding line and associated with marks.

In the above described embodiment, as illustrated in FIGS. 6 and 7 and the like, the example in which the written characters R written on the paper media 70 are sorted to and stored in one folder integrally as a whole is explained, but this is not limiting. For example, in an example illustrated in FIG. 11A, three groups of written characters RE written characters R2, and written characters R3 are written on the paper media 70. Then, the mark M corresponding to each of the folders F1 to F4 is entered at a portion (a position substantially on the same row in this example) having a predetermined positional relationship corresponding to each of the written characters R1, R2, and R3.

That is, in this example, the "☆" mark M is entered for and associated with the written characters RE the "☆" mark M is also entered for and associated with the written characters R2, and the "□" mark M is entered for and associated with the written characters R3. As a result, by means of the above described association, the stroke data of the written characters R1 is stored in the "schedule" folder F3, the stroke data of the written characters R2 is stored in the "schedule" folder F3, and the stroke data of the written characters R3 is further stored in the "TODO" folder F2 by the CPU 201. Note that, it may be so configured that only those underlined in the written characters R1 to R3 are associated with the mark M at the position on substantially the same row instead of association between the written characters R1 to R3 and the mark M present on substantially the same row as described above.

Figure 11B:
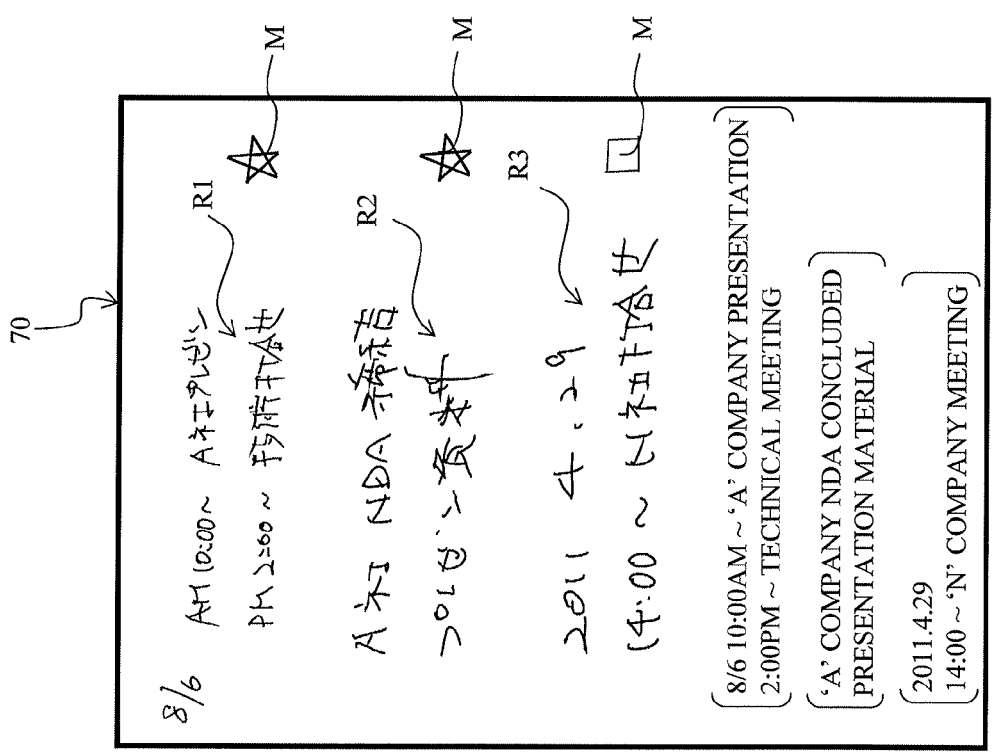

(3) If a Part of Written Characters is Surrounded by a Surrounding Line and Associated with a Mark As explained in the above described embodiment by using FIG. 7, the whole of the written characters R written on the paper media 70 are surrounded by the surrounding line RC and integrally sorted to and stored in one folder. On the other hand, in this variation, as illustrated in FIG. 11B, after the user writes the written characters R1, R2, and R3 on the paper media 70, the user designates the stroke data to be sorted out by surrounding only two written characters R1 and R2 among them by the surrounding line RC. Moreover, in order to designate the destinations to sort the designated written characters R1 and R2, the "□" mark M is entered at a position slightly distant and on substantially the same row as the written characters R3, and in order to clarify correspondence, the surrounding line RC extends to the position of the "□" mark M and contains the "□" mark M.

(4) Other Variations

In the above described embodiment and the variations (2) and (3), one visual object for identification is composed of the mark M, but this is not limiting. For example, instead of the "Δ", "□", "☆", and "X" marks, other types of visual objects such as appropriate numbers, symbols and the like may be used. Moreover, the destination folder of sorting may be designated by combining the mark M and numbers or symbols. In this case, by making designations as "☆1", "☆2", "☆3", and "☆4", any one of four small folders provided in the schedule folder F3 can be further divided and designated as a sorting destination.

(5) Processing at Operation Processing Terminal

In the above, the position detection function of the electronic pen 3, the function of creating the stroke data from the detected position, the function of detecting the marks such as "Δ", "□", "☆" and "X", and the function of sorting and storing the above described created stroke data to the folder according to the above described mark detection result are all provided in the electronic writing apparatus 2. However, this is not limiting.

That is, as illustrated in FIG. 1 above, an operation processing terminal 400 connected to the electronic writing apparatus 2 via the network NW is provided, therefore an electronic writing system is configured by the operation processing terminal 400 and the electronic writing apparatus 2. In the electronic writing system, the creation of the above described stroke data, the mark detection, and the creation of the stroke data is performed in the operation processing terminal 400 after the positional information of the electronic pen 3 detected by the electronic writing apparatus 2 is acquired.

In FIG. 1, the operation processing terminal 400 (See a two-dot chain line in FIG. 1) is connected to the electronic writing apparatus 2 and the server SV via the wired or wireless network NW, capable of information transmission and reception. The operation processing terminal 400 is composed of a personal computer, for example, and has a display part 401 such as a liquid crystal display and the like, an operation part 402 such as a keyboard, a mouse and the like, a storage device (not shown), a communication interface (not shown. corresponding to a second communicating device), a CPU (not shown, corresponding to a second computing device), an ROM (not shown), an RAM (not shown. corresponding to a second storage device) and the like.

The storage device is an appropriate large capacity storage device provided with a hard disk or the like, for example. The communication interface is connected to the communication control part 207 of the electronic writing apparatus 2 via the network NW, capable of information transmission/reception. The display part 401 is composed of a liquid crystal display, for example, and presents display to a user similar to the display part 21 of the electronic writing apparatus 2. The CPU on the operation processing terminal 400 side executes a control program stored in advance in the ROM or the storage device while using a temporary storage function of the above described RAM. As a result, the CPU executes control of the whole operation processing terminal 400.

It is to be noted that in this variation, the electronic writing apparatus 2 configures a writing position detecting apparatus described in each claim, and the operation processing terminal 400 configures a writing data processing apparatus.

Figure 12:
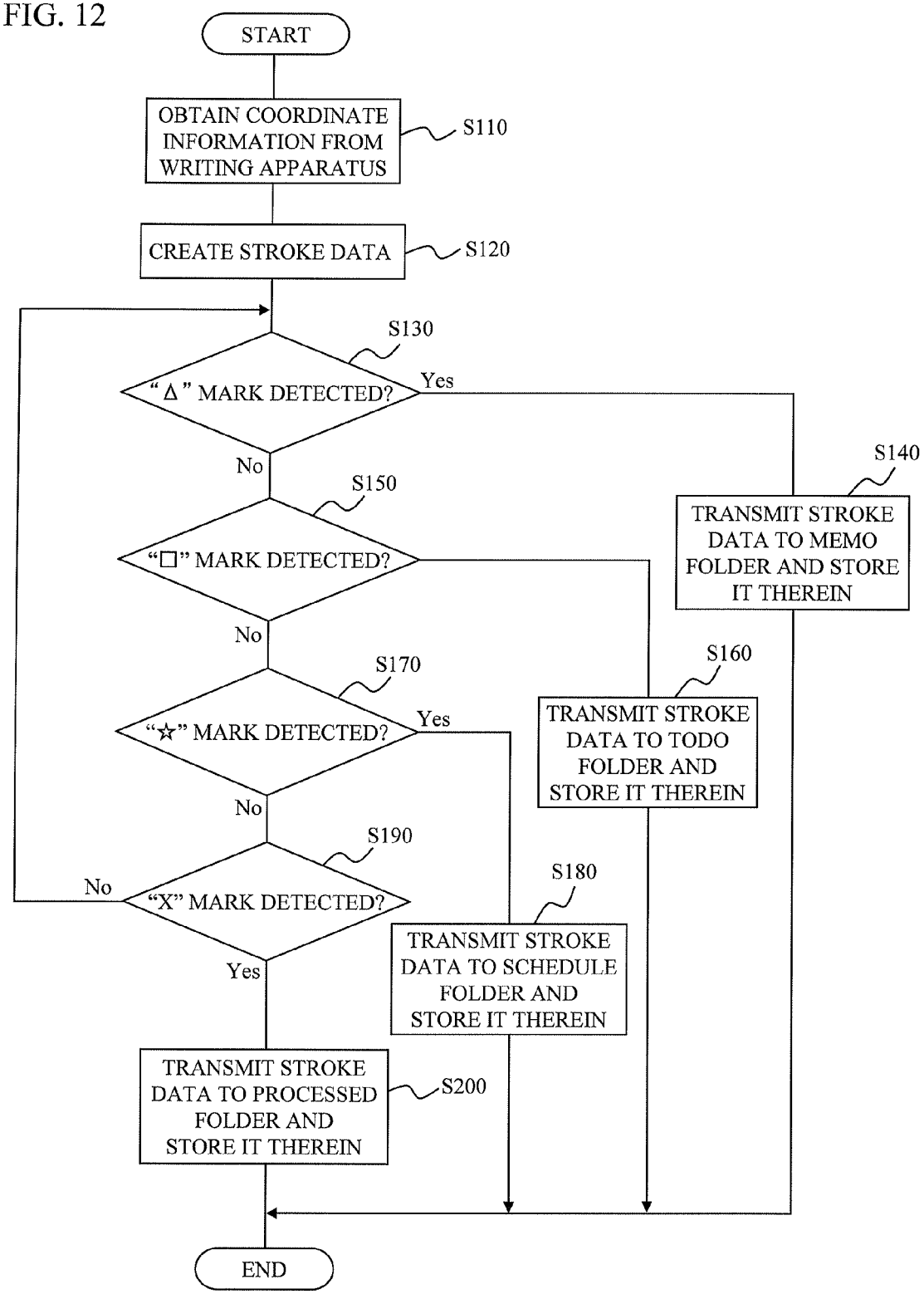
FIG. 12 is a flowchart illustrating a control procedure executed by the CPU of an operation processing terminal in a variation in which processing is executed by the operation processing terminal.

By referring to FIG. 12, a control procedure executed by the above described CPU of the operation processing terminal 400 of this variation will be described. In FIG. 12, first, at Step s110, the CPU of the operation processing terminal 400 acquires coordinate information of written characters R by the electronic pen 3 acquired by the above described coordinate detection part 25 of the electronic writing apparatus 2 as described above through the communication control part 207 and the above described network NW.

After that, at Step S120, the CPU of the operation processing terminal 400 creates the stroke data corresponding to the contents of the user's written characters R as above on the basis of the coordinate information acquired at Step the above described S110 similarly to Step S20 in the above described FIG. 8. The created stroke data is temporarily stored in the above described RAM. Note that, this procedure functions as the second data creating portion as well as corresponds to a second data creating step, described in each claim.

Step S130, Step S140, Step S150, Step S160, Step S170, Step S180, Step S190, and Step S200 are equal to Step S30, Step S40, Step S50, Step S60, Step S70, Step S80, Step S90, and Step S100 in the above described FIG. 8, respectively. That is, at Step S130, Step s150, Step S170, and Step S190, the CPU of the operation processing terminal 400 determines whether the "Δ", "□", "☆", and "X" marks M are detected in the stroke data of the written characters R or not on the basis of the creation result of the stroke data at the above described Step S120. Moreover, in accordance with satisfaction or not of the determination result at that time, the CPU of the operation processing terminal 400 accesses the server SV via the network NW by means of the above described communication interface at Step S140, Step S160, Step S180, and Step S200 and stores the above described stroke data in any of the above described folders F1, F2, F3 and F4 corresponding to each mark.

It is to be noted that in the above, Step S130, Step S150, Step S170, and Step S190 function as a second visual object detecting portion described in each claim, as well as corresponds to a second visual object detecting step. Further, the above described Step S140, Step S160, Step S180, and Step S200 function as a second transmission control portion as well as corresponds to a second transmission control step, described in each claim.

In this variation configured as above, the contents written by the user on the paper media 70 by using the electronic pen 3 in the electronic writing apparatus 2 can be digitized into electronic data in the operation processing terminal 400. That is, if the user makes desired writing on the predetermined paper media 70 by using the electronic pen 3, a plurality of pieces of positional information of the electronic pen 3 moving by the writing operation is detected by the electronic writing apparatus 2. Then, by using the detected plurality of pieces of positional information, the operation processing terminal 400 creates the stroke data corresponding to the writing on the paper media 70. This created stroke data is temporarily stored in the above described RAM (not shown) of the operation processing terminal 400.

Then, in this variation, the stroke data corresponding to the written contents stored as above can be sorted to and stored in a desired folder in the server SV by the operation processing terminal 400. That is, when the user makes (or has made) writing on the paper media 70 as above, the mark M associated with the folder in which the contents of the writing is stored is entered at a desired position having a predetermined positional relationship with the writing. As a result, the entry of the above described mark M is detected by the CPU of the operation processing terminal 400, and the stroke data stored in the above described RAM is automatically sorted to and stored in the desired folder corresponding to the above described mark M in the folders F1 to F4 provided in the server SV.

Note that, in the above, the movement of the electronic pen 3 by the writing operation of the user is detected by detecting the magnetic field from the electronic pen 3 by the coordinate detection part 25, but this is not limiting. That is, a method of detecting the movement of the tip end of the electronic pen 3 in the writing operation of the user by using an ultrasonic wave, infrared rays, a photographing result by a camera and the like may be used. Moreover, the movement of the tip end of the electronic pen 3 may be detected by providing known pressure sensing means on the placement part 24 of the electronic writing apparatus 2 and by detecting a force of pressing the paper media 70 by the tip end of the electronic pen 3 in the writing operation of the user by the above described pressure sensing means. In this case, a general-purpose pen such as an ordinary ball-point pen can be used instead of a pen provided with the coil 35 for generating the magnetic field as above as the electronic pen 3.

Moreover, in the above, the CPU 201 transmits the corresponding written characters R to the server SV upon writing of the mark M as a trigger and stores them in any one of the folders F1 to F4, but this is not limiting. That is, it may be so configured that a plurality of folders in categories intended by the user such as the above described folders F1 to F4 is provided inside the electronic writing apparatus 2 (such as the coordinate information storage region 2041 and the like of the above described flash memory 204, for example), and the written characters are automatically sorted to and stored in the plurality of folders inside the electronic writing apparatus 2 upon the same trigger as above. Moreover, it may be so configured that the written characters are stored in the plurality of folders inside the electronic writing apparatus 2 once and then, outputted to and stored in the above described folders F1 to F4 of the server SV upon some trigger. In this case, the plurality of folders for temporary storage may be provided outside the electronic writing apparatus 2 or a separate PC terminal, a mobile terminal, a smartphone and the like.

It is to be noted that the flowcharts illustrated in FIGS. 8, 10, and 12 do not limit the present disclosure to the procedures illustrated in the above described flows but addition/deletion or a change of order of the procedures and the like are possible within a range not departing from the gist and the technical idea of the disclosure.

Moreover, other than those described above, methods of the above described embodiment and each of the variations may be appropriately combined and used.

Though not individually exemplified, the present disclosure is put into practice with various changes within the range not departing from its gist.

What is claimed is:

1. An electronic writing apparatus comprising:
a position acquisition portion that acquires a plurality of pieces of positional information of a writing instrument moving along with a writing operation of an operator on a media to be written using said writing instrument;
a first visual object detecting portion that detects a visual object for identification entered at a desired position of said media to be written for selecting a plurality of storage destinations provided in an external storage device on the basis of said positional information acquired by said position acquisition portion;
a first data creating portion that creates image data corresponding to writing on said media to be written by said writing instrument and having a predetermined positional relationship with said visual object for identification on said media to be written, by using the plurality of pieces of positional information acquired by said position acquisition portion;
a first storage device that temporarily stores image data created by said first data creating portion;
a first communication device that transmits said image data via communication for storing the image data in said external storage device;
a first transmission control portion that controls said first communication device upon detection of said visual object for identification by said first visual object detecting portion and performs transmission for storing said image data created by said first data creating portion and stored in said first storage device in said storage destination corresponding to said visual object for identification detected by said first visual object detecting portion; and
a surrounding line detecting portion that detects a surrounding line substantially surrounding writing by said writing instrument on said media to be written on the basis of said positional information acquired by said position acquisition portion, wherein
said first visual object detecting portion detects said visual object for identification located inside the surrounding line, as said predetermined positional relationship, and
said first communication device performs transmission for storing said image data corresponding to said writing substantially surrounded by said surrounding line in said storage destination corresponding to said visual object for identification detected by said first visual object detecting portion, on the basis of the control by said first transmission control portion.

2. The electronic writing apparatus according to claim 1, wherein:
said first data creating portion creates character string image data corresponding to a character string written by said writing instrument on said media to be written, and
said first visual object detecting portion detects said visual object for identification located inside the surrounding line and in a row different from a row including said character string on said media to be written, as said predetermined positional relationship.

3. A non-transitory recording medium capable of reading by a computing device, storing writing data processing program for executing steps on a second computing device of a writing data processing apparatus that is connected with a writing position detecting apparatus and is capable of transmitting/receiving information to/from the writing position detecting apparatus and has a second communication device that transmits image data, a second storage device that stores image data, and said second computing device, said steps comprising:
a second visual object detecting step for detecting a visual object for identification detected by said writing position detecting apparatus and entered at a desired position of a media to be written, for selecting a plurality of storage destinations provided in an external storage device on the basis of positional information of a writing instrument moving along with a writing operation of an operator on said media to be written provided in the writing position detecting apparatus;
a second data creating step for creating image data corresponding to writing on said media to be written by said writing instrument and having a predetermined positional relationship with said visual object for identification on said media to be written by using a plurality of pieces of said positional information detected by said writing position detecting apparatus;
a second transmission control step for controlling said second communication device upon detection of said visual object for identification in said second visual object detecting step and performing transmission for storing said image data created in said second data creating step and stored in said second storage device in said storage destination corresponding to said visual object for identification detected in said second visual object detecting step; and
a surrounding line detecting step for detecting a surrounding line substantially surrounding writing by said writing instrument on said media to be written on the basis of said positional information detected by said writing position detecting apparatus, wherein
in said second visual object detecting step, said visual object for identification located inside the surrounding line is detected, as said predetermined positional relationship; and
in said second transmission control step, transmission for storing said image data corresponding to writing substantially surrounded by said surrounding line in said storage destination corresponding to said visual object for identification detected in said second visual object detecting step, is performed.

4. The non-transitory recording medium according to claim 3, wherein:
in said second data creating step, character string image data corresponding to a character string written by said writing instrument on said media to be written is created, and
in said second visual object detecting step, said visual object for identification located inside the surrounding line and in a row different from a row including said character string on said media to be written is detected, as said predetermined positional relationship.

5. An electronic writing system having a writing position detecting apparatus and a writing data processing apparatus,
the writing position detecting apparatus comprising a position acquisition portion that acquires a plurality of pieces of positional information of a writing instrument moving along with a writing operation of an operator on a media to be written using said writing instrument;
the writing data processing apparatus comprising:
a second visual object detecting portion that detects a visual object for identification entered at a desired position of said media to be written for selecting a plurality of storage destinations provided in an external storage device on the basis of said positional information acquired by said position acquisition portion of said writing position detecting apparatus;
a second data creating portion that creates image data corresponding to writing on said media to be written by said writing instrument and having a predetermined positional relationship with said visual object for identification on said media to be written, by using the plurality of pieces of positional information acquired by said position acquisition portion of said writing position detecting apparatus;
a second storage device that temporarily stores image data created by said second data creating portion;
a second communication device that transmits said image data via communication for storing the image data in said external storage device;
a second transmission control portion that controls said second communication device upon detection of said visual object for identification by said second visual object detecting portion and performs transmission for storing said image data created by said second data creating portion and stored in said second storage device in said storage destination corresponding to said visual object for identification detected by said second visual object detecting portion; and
a surrounding line detecting portion that detects a surrounding line substantially surrounding writing by said writing instrument on said media to be written on the basis of said positional information acquired by said position acquisition portion, wherein
said second visual object detecting portion detects said visual object for identification located inside the surrounding line, as said predetermined positional relationship, and
said second communication device performs transmission for storing said image data corresponding to said writing substantially surrounded by said surrounding line in said storage destination corresponding to said visual object for identification detected by said second visual object detecting portion, on the basis of the control by said second transmission control portion.

6. The electronic writing system according to claim 5, wherein:
said second data creating portion creates character string image data corresponding to a character string written by said writing instrument on said media to be written, and
said second visual object detecting portion detects said visual object for identification located inside the surrounding line and in a row different from a row including said character string on said media to be written, as said predetermined positional relationship.

\* \* \* \* \*